United States Patent [19]
Zöller et al.

[11] Patent Number: 5,597,622
[45] Date of Patent: Jan. 28, 1997

[54] PROCESS FOR THE PRODUCTION OF A REFLECTION-REDUCING COATING ON LENSES

[75] Inventors: Alfons Zöller, Bad Soden-Salmünster; Karl Matl, Kleinostheim; Rainer Götzelmann, Rodenbach; Günther Sauer, Maintal, all of Germany

[73] Assignee: Leybold Aktiengesellschaft, Hanau, Germany

[21] Appl. No.: 177,638

[22] Filed: Jan. 4, 1994

Related U.S. Application Data

[63] Continuation of Ser. No. 838,988, Feb. 21, 1992, abandoned.

[30] Foreign Application Priority Data

Aug. 28, 1991 [DE] Germany .......................... 41 28 547.6

[51] Int. Cl.$^6$ ................ B05D 3/06; B05D 5/06; H05H 1/02; H05H 1/24
[52] U.S. Cl. .......... 427/563; 427/567; 427/574; 427/579; 427/167
[58] Field of Search ..................... 359/580, 581, 359/586, 883, 884; 351/166

[56] References Cited

U.S. PATENT DOCUMENTS

| | | | |
|---|---|---|---|
| 2,758,510 | 8/1956 | Auwarter .................. | 359/581 |
| 3,356,522 | 12/1967 | Libbert . | |
| 3,811,753 | 5/1974 | Onoki et al. . | |
| 3,984,581 | 10/1976 | Dobler et al. .................. | 359/581 |
| 3,991,234 | 11/1976 | Chang et al. . | |
| 4,052,520 | 10/1977 | Chang et al. . | |
| 4,130,672 | 12/1978 | Onoki et al. .................. | 359/580 |
| 4,497,539 | 2/1985 | Sakurai et al. . | |
| 4,514,437 | 4/1985 | Nath .................. | 427/527 |
| 4,590,117 | 5/1986 | Taniguchi et al. .................. | 359/581 |
| 4,624,859 | 11/1986 | Akira et al. .................. | 427/527 |
| 4,634,600 | 1/1987 | Shimizu et al. .................. | 427/527 |
| 4,657,774 | 4/1987 | Satou et al. .................. | 427/527 |
| 4,673,586 | 6/1987 | White .................. | 427/527 |
| 4,759,948 | 7/1988 | Hashimoto et al. .................. | 427/527 |
| 4,784,877 | 11/1988 | Trumble .................. | 427/527 |
| 4,830,873 | 5/1989 | Benz et al. .................. | 427/489 |
| 4,921,724 | 5/1990 | Hubert et al. . | |
| 4,921,760 | 5/1990 | Tani et al. .................. | 359/581 |
| 4,944,581 | 7/1990 | Ichikawa .................. | 359/884 |
| 4,979,802 | 12/1990 | Ichikawa .................. | 359/884 |
| 4,988,164 | 1/1991 | Ichikawa .................. | 359/580 |
| 5,015,353 | 5/1991 | Habler et al. .................. | 427/527 |
| 5,053,245 | 10/1991 | Kiyama et al. .................. | 427/566 |
| 5,077,112 | 12/1991 | Hensel et al. .................. | 427/488 |
| 5,085,904 | 2/1992 | Deak et al. .................. | 427/571 |
| 5,415,756 | 5/1995 | Wolf et al. .................. | 427/564 |

FOREIGN PATENT DOCUMENTS

| | | |
|---|---|---|
| 0254205 | 1/1988 | European Pat. Off. . |
| 0252870 | 1/1988 | European Pat. Off. . |
| 0266225 | 5/1988 | European Pat. Off. . |
| 0403985 | 6/1990 | European Pat. Off. . |
| 2210505 | 9/1973 | Germany . |
| 2538982 | 9/1974 | Germany . |
| 2738044 | 3/1978 | Germany . |
| 2829279A1 | 1/1980 | Germany . |

(List continued on next page.)

OTHER PUBLICATIONS

Preprint: Presented at the Sec.PSE Conf. Garmisch–Part. 1990, Article entitled "Ion assisted deposition with a new plasma source" by Matl et al. pp. 1–7 no month.

Primary Examiner—Marianne Padgett
Attorney, Agent, or Firm—Felfe & Lynch

[57] ABSTRACT

The invention relates to a process of providing a scratch-resistant coating for a lens made of an optical material comprising synthetics. In order for the synthetic material, for example a CR 39, to be protected against scratches, a very thin adhesion layer of SiO is applied first, and is subsequently provided with a thick $SiO_2$ layer. Both layers are deposited in a vacuum chamber which comprises both a thermal vaporizer for vaporizing the coating materials and a plasma source for irradiating the substrate simultaneously with application of the vaporized coating material.

8 Claims, 2 Drawing Sheets

FOREIGN PATENT DOCUMENTS

| | | | |
|---|---|---|---|
| 3624467 | 1/1988 | Germany . | |
| 3818341 | 12/1988 | Germany . | |
| 0294572 | 12/1988 | Germany . | |
| 3909654A1 | 11/1989 | Germany . | |
| 3931713 | 3/1991 | Germany . | |
| 4020158A1 | 1/1992 | Germany . | |
| 0004152 | 1/1979 | Japan | 359/581 |
| 0023557 | 2/1979 | Japan | 359/581 |
| 355145739 | 11/1980 | Japan | 427/527 |
| 60-130704 | 7/1985 | Japan | 359/586 |
| 60-130703 | 7/1985 | Japan | 359/586 |
| 60-130701 | 7/1985 | Japan | 359/586 |
| 60-131501 | 7/1985 | Japan | 359/586 |
| 61-246361 | 11/1986 | Japan | 427/529 |
| 2086943 | 5/1982 | United Kingdom | 427/527 |

PROCESS FOR THE PRODUCTION OF A REFLECTION-REDUCING COATING ON LENSES

This application is a continuation of application Ser. No. 07/838,988 filed Feb. 21, 1991, now aband.

FIELD OF THE INVENTION

The invention relates to a process and a device for producing a reflection-reducing coating on an optical lens, and more particularly to a process and a device for providing layers of a predetermined thickness and hardness on selected surfaces of an optical lens.

BACKGROUND OF THE PRIOR ART

With optical lenses, a need very often arises for applying a protective coating which is light-permeable and yet is reflection-reducing. This applies for camera lenses as well as also for lenses of eye glasses. In the case of inept or careless handling by the user eyeglasses can be subjected to extreme stress which causes scratching not only of synthetic glasses but also of silicate glasses. Sharp objects are typically responsible when drawn across the lens surface under pressure. Examples include dust or sand with sharp edges in a polishing cloth or in a case for storing the glasses, rough tissue used to wipe them.

Because they combine the property of low weight and greater resistance to breakage, with the possibility of individual coloring, synthetic glasses are used increasingly more often. However, they have the serious disadvantage that their surfaces, which are considerably softer compared to silicate glasses are very susceptible to mechanical damage.

Duroplastics which comprise macromolecules chemically closely enmeshed with one another are used widely to make synthetic lenses. They are most often very brittle at room temperatures. In addition, they are temperature stable, not weldable, insoluble, and only weakly swellable. One duroplastic preferred in lens systems used for eyeglasses is CR 39 which is a diallyldiethylene glycolcarbonate. Only very recently, apart from these synthetic materials used nearly exclusively in lens systems for glasses, other synthetic materials such as polymethylmethacrylate (PMMA), polystyrene (PS), and polycarbonate (PC) have also been employed.

If, for example, a CR 39 synthetic is to be provided with an appropriate protective covering the problems of detachment of the protective layer from the lens body, the difference in thermal expansion between the protective layer and the body, and in many cases the low temperature stability of the protective coating, must be solved.

With silicate coatings, the substrate is heated to a high temperature of approximately 300° C. whereby sufficient energy is available of the coating molecules applied in a vapor deposition process to generate defect-free dense layers. In contrast, when producing a synthetic layer, the vapor deposition as a rule must be carried out at low temperature.

In order to make available the energy required in this case, the grown layers are bombarded with ions of an inert gas. Additional ionization of vapor particles and a reactive gas reinforces the densification process in layer-forming condensation.

Apart from these so-called ion-assisted vapor deposition processes (IAD), so-called plasma polymerization is also known in which during the layer formation the properties of the layer can be changed continuously. The resulting properties are adapted to the synthetic surface from the aspect of the chemical structure and form on the lens surface a glass-like structure which has very high mechanical abrasion resistance.

A process for the production of transparent protective coatings comprising silicon compounds is already known and used in the coating of synthetic substrates (See DE-A-3 624 467 and EP-A-0 254 205). In this process, a chemical vapor deposition takes place under the effect of a plasma (plasma chemical vapor deposition) onto a polymerizable monomeric organic compound from the group of the siloxanes and silazanes wherein to the polymerization process oxygen is supplied in excess. Plasma is generated by means of high frequency current between two electrodes of which the one has the function of a cathode and is connected with the substrates. Before the coating proper, the substrates are exposed in an atmosphere comprising a noble gas to an ion bombardment by glow discharge in the presence of the organic compounds.

In another known process of plasma-enhanced coating of a substrate with a polymerizable silicon-comprising monomer the monomers are restricted to silanes, silazanes or disilazanes, and the plasma coating is carried out until a particular Taber wear index is attained (See EP-A-0 252 870).

A device is also known (See DE-C-3 931 713) with which optical lenses can be coated on both sides in a plasma-enhanced process. This device comprises two electrodes between which are disposed holding elements for the work pieces to be coated. The holding elements therein are at a defined electrical potential.

A similar process is known (per EP-A-0 403 985) for the pretreatment of transparent synthetic substrates intended for vacuum coating. It has been found that through plasma bombardment of the substrate surface this surface is changed in such a way that the subsequent layer can be applied with a high degree of adhesive strength.

In a further device for the coating of substrates a vacuum chamber is provided with a substrate carrier disposed in it and having a plasma generator, a magnet and an electron emitter. Also, in the vacuum chamber a device is provided for the generation of atoms, molecules or clusters of the materials for the generation of the layer on the substrates, and is located immediately next to the plasma generator and opposite the substrates (See EP-90123712.3, K. Matl, W. Klug, A. Zöller; "Ion assisted deposition with a new plasma source," Paper presented at the Sec. PSE Conf., Garmisch-Partenkirchen 1990). One advantage of this device resides in that, in contrast to earlier devices of the ion-assisted deposition (IAD) type, it can act upon substrate holders having a diameter of approximately 1 m with high plasma density.

Moreover, antireflection coatings are known which are applied onto synthetic lenses and comprise, for example, two layers of which the first layer is a $SiO_x$ layer and the second layer is a SiO layer (per DE-OS 27 38 044, FIG. 1A).

Further, antireflection coatings are known comprising four or more discrete layers wherein, for example, beginning at the substrate, the layer sequence is as follows: SiO, $SiO_2$, $CeO_2$, $SiO_2$, $CeO_2$, $SiO_2$, $CeO_2$ (See DE-OS 38 18 341).

Lastly, a process for the production of synthetic objects with hard coatings is also known, in which a layer based on silicon is disposed on a foundation material and a $SiO_2$ film is applied onto this layer (See EP-A-0 266 225). The $SiO_2$ layer is applied by means of a vacuum vapor deposition process, preferably in an ion-plating process.

SUMMARY OF THE DISCLOSURE

A principal object of this invention is to provide a device for forming a scratch-resistant coating on eye glasses, lenses and the like comprising a relatively soft synthetic material.

The advantage achieved with the invention resides in particular in that there are decreased tensions between the relatively soft synthetic substrate and the hard coating of the coated lenses.

The SiO layer is selected to be of minimum thickness because SiO, for the application according to the invention, has optically undesirable properties and is therefore used primarily for the purpose of ensuring adhesion. With increasing layer thickness of SiO the reflection is curved ($r=f(\lambda)$) brought about by the succeeding thick $SiO_2$ layer. Moreover SiO is not absorption-free. A thin SiO layer therefore keeps the undesirable reflections and absorption within reasonable limits and yet fulfills the requirements made of the adhesive strength. The $SiO_2$ protective layer, in contrast, must be relatively thick, i.e. 500 nm, since otherwise the requirements made of the scratch-resistance are not met. Thinner $SiO_2$ layers at the given stress break down even if they are very hard. Moreover, they cause undesirable oscillations of the reflection curve. In the case of thicker $SiO_2$ layers the oscillations are also present, however, the wavelength interval of the minima and maxima becomes smaller with increasing layer thickness so that no disturbing interference effects can be observed on visual inspection.

These and other related objects of the invention are realized by providing a coated optical lens, comprising a transparent synthetic substrate with a first layer of SiO disposed directly on the substrate and a second layer of $SiO_2$ disposed on the first layer, wherein the SiO first layer has a thickness of varying from that of one molecule up to 50 nm and the $SiO_2$ second layer has a thickness of at least 500 nm.

In another aspect of the invention, there is provided an apparatus for the generation of a thin layer on a synthetic substrate, a chamber in which a plasma can be generated comprising:

in the chamber a plasma source opposing the synthetic substrate;

in the chamber a vaporizer next to the plasma source; and in the chamber at least one ring magnet above the substrate.

BRIEF DESCRIPTION OF THE DRAWING

Embodiments of the invention are illustrated in the drawing and will be described in greater detail in the following.

DETAILED DESCRIPTION OF THE PREFERRED EMBODIMENT

Figure 1:
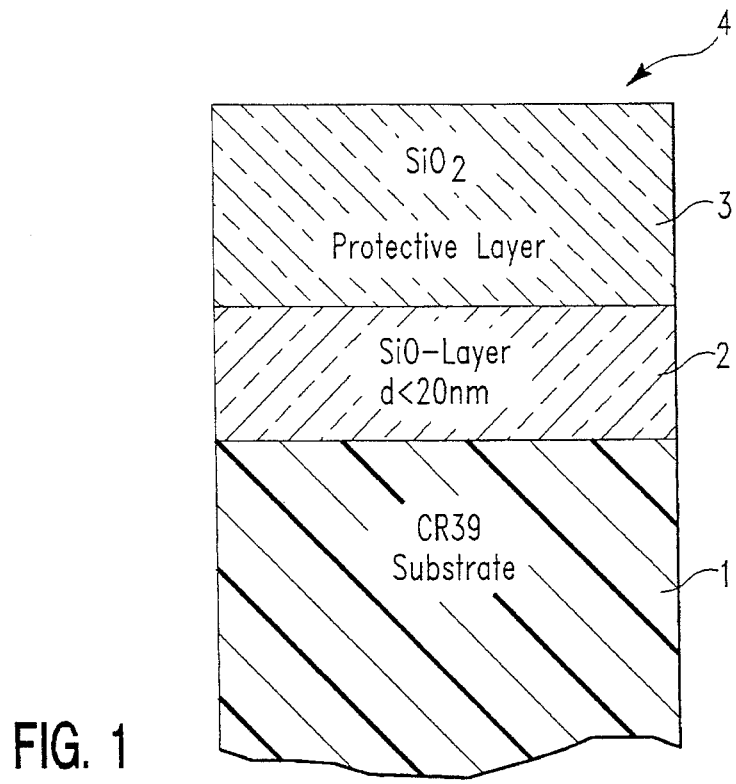
FIG. 1 is a cross-sectional view of a two-layer configuration on a synthetic lens substrate.

In FIG. 1 there is depicted a lens substrate 1 of a synthetic material, for example CR 39, which is provided with a very thin SiO layer 2 having a thickness varying from that of one molecule of SiO up to 20 nm. This layer 2 serves essentially for the purpose of effecting a better adhesion of a protective coating 3 with a thickness of at least 500 nm of $SiO_2$.

As has been found, a $SiO_2$ layer applied directly adheres only poorly on synthetic materials. In so-called boiling tests, coated substrates are cyclically immersed for a defined time in a boiling salt solution comprising, for example, 5% NaCl in water. They are subsequently plunged into cold water. A layer of $SiO_2$ applied directly on a synthetic material becomes very rapidly detached in such boiling tests, for example after 5 to 10 minutes. In contrast, if a SiO layer 2 is disposed between the $SiO_2$ layer 3 and the substrate of synthetic material which is coated under simultaneous plasma and ion bombardment with a resistance vaporizer boat or an electron beam gun, the adhesion of the $SiO_2$ layer 3 increases considerably. Even after a boiling test lasting 40 minutes no impairments on layers 2 and 3 could be detected.

With a relatively thick $SiO_2$ layer 3, the wear properties are significantly improved relative to the synthetic substrate 1. CR 39, for example, has a hardness of approximately 180 to $200N/mm^2$. Dense quartz, in contrast, has a hardness of $4500N/mm^2$. The hardness of the protective layer 3 can be adjusted in very broad range via controlled variations in the plasma and coating parameters. Through special plasma coatings hardness values of approximately $1000N/mm^2$ up to nearly $4500N/mm^2$ have so far been achieved. The hardness of protective layer 3 may be increased from $500N/mm^2$ to $4500N/mm^2$.

The wear resistance increases basically with the hardness and the layer thickness and at a layer thickness beginning at approximately 3 to 8 µm a saturation effect in the wear resistance occurs as a function of the hardness. In the production of very hard and consequently brittle layers, strong tensions between layer and substrate are generated. For example, CR 39 has a coefficient of thermal expansion of approximately $1\times10^{-4}/K$ while, in contrast, the coefficient of thermal expansion of quartz is almost negligible. Accordingly, a 70 mm CR 39 lens expands by approximately 0.4 mm at a temperature difference of 80° C. The expansion of quartz, in contrast, is nearly 0. The tensions caused by the disparity in thermal expansion makes great demands made on the adhesion of the layer. It is therefore useful to break down at least a part of the tensions in the layer itself. This is achieved via a hardness gradient, i.e., the hardness increases from the substrate in an outward direction. For the production of the $SiO_2$ layer it is proposed to use $SiO_2$ as the starting material instead of a suboxide. $SiO_2$ can be vaporized with very relatively low vaporizer power. The thermal stress placed on the substrates can thereby be kept to a minimum during the production of the thick protective layer.

Figure 2:
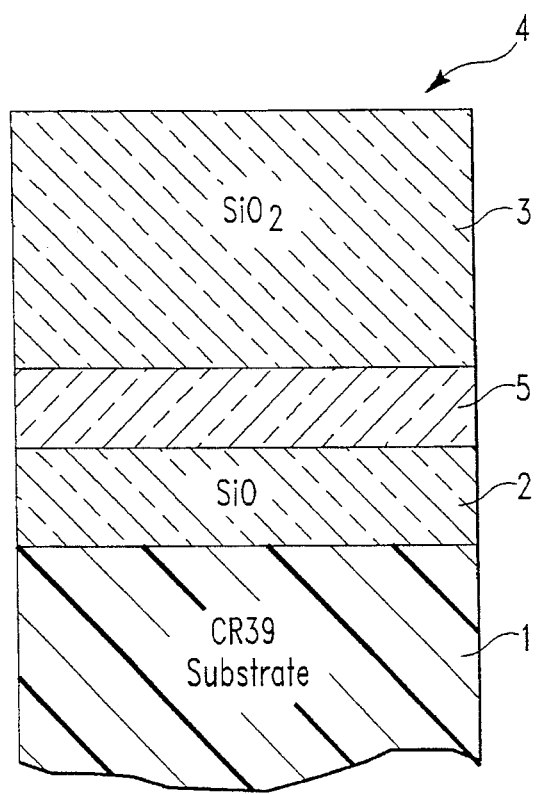
FIG. 2 is a cross-sectional view of a three-layer configuration on a synthetic lens substrate.

In the structure according to FIG. 2, by inserting a layer 5 between the SiO and the $SiO_2$ layer the oscillations in the reflection curve can be decreased considerably. This layer 5 preferably has an index of refraction smaller than the index of refraction of the substrate 1 and greater than the index of refraction of the protective layer 3. If CR 39 is used as the substrate and if the protective layer 3 comprises $SiO_2$, the index of refraction of layer 5 is preferably between 1.45 and 1.52. The thickness of layer 5 preferably is approximately 80 to 120 nm, which at a wavelength of light of 550 nm corresponds to a quarter wavelength. Through this measure, the oscillations due to the thickness of the layer 3 are attenuated.

Figure 3:
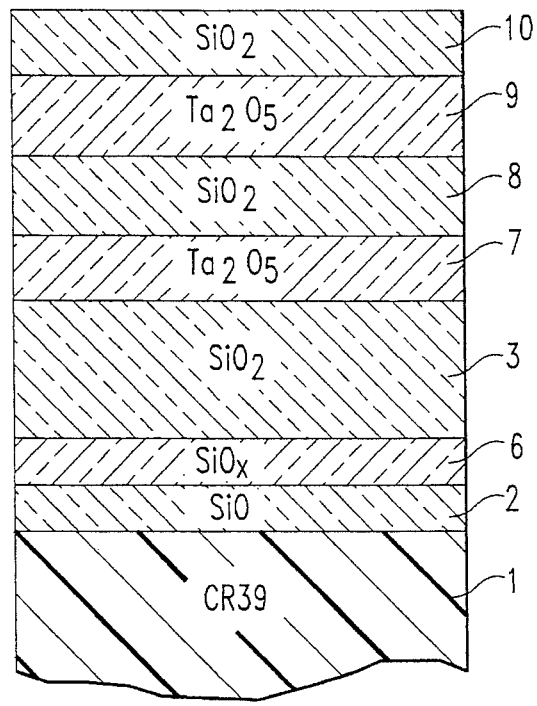
FIG. 3 is a cross-sectional view of a seven-layer configuration on a synthetic lens substrate.

FIG. 3 depicts a variation of the FIG. 2 embodiment, in which as intermediate layer 6 a $SiO_x$ layer is used (wherein x is a value between 1 and 2). On the $SiO_2$ layer 3 is disposed a combination of four further layers 7 to 10 which serve exclusively for the purpose of reducing the reflection. These layers comprise alternately $Ta_2O_5$ and $SiO_2$, and the uppermost layer is $SiO_2$.

Figure 4:
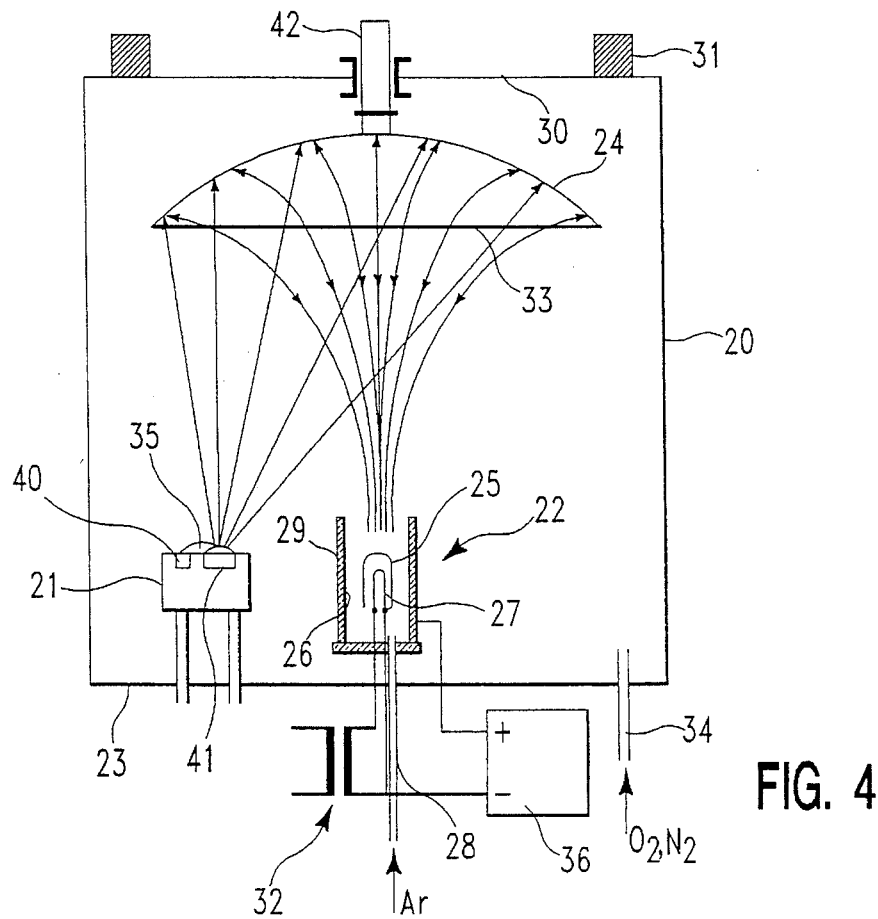
FIG. 4 is a cross-sectional view of a schematic representation of a plasma IAD process for the generation of thin layers according to this invention.

The production of the layers takes place in the manner described in the following and in conjunction with FIG. 4.

In a standard vacuum installation 20 the layers are deposited by means of an electron beam vaporizer 21 (see above Matl, Klug, Zöller). A plasma source 22 is disposed in the center and on the bottom 23 of the installation 20 and is directed onto an electrically insulating substrate holder 24. In the plasma source 22 is disposed a cylindrical electron-emitting $LaB_6$ cathode 25 encompassed by a cylindrical anode 26 having a diameter of approximately 50 mm. A glow discharge plasma is generated in a noble gas, primarily argon, which is introduced via a line 28.

A cylindrical magnet coil 29 encloses the anode 26, and the possibility for movement of the electrons generated by the plasma is thus considerably increased in the axial direction and is considerably decreased in the radial direction. The electrons move in a spiral path about the magnetic field lines, whereby the plasma reaches the coating chamber 20. On the top 30 of the coating chamber 20 and above the substrate holder 24 is provided an annular magnet coil 31 with an inner diameter greater than the diameter of the substrate holder. The magnetic field of this ring magnet 31 and the magnetic field of the cylinder coil 29 are superimposed and form a guidance field for the electrons on their way from the cathode 25 heated indirectly by a heater 27 and fed, in turn, by the energy supply 32, as well as for the entire plasma between the plasma source 22 and the substrate holder 24. In front of the dome-form substrate holder 24 is generated a dome-form plasma boundary layer. Because the potential of the substrate holder 24 relative to the plasma is negative, the ions are accelerated out of the plasma boundary layer and bombard a growing film which is thereby densified.

A significant advantage of the production process according to this invention in comparison to the conventional IAD processes with one ion source resides in that the ions starting out of a plasma boundary layer formed parallel to the entire inner face of the substrate holder are accelerated over a short distance. In the case of an ion source where the acceleration takes place from the bottom of the chamber the conditions are different. In the device according to FIG. 4 the ions from the plasma boundary layer are not influenced by collisions and energy losses. Moreover, the plasma extends over the entire area between the plasma source 22 and the substrate holder 24 so that the ion source basically covers the same area as the substrate holder 24. With a conventional ion source with grid extraction an extraction grid area is required corresponding closely to the beamed-upon area on the substrate.

A reactive gas, for example $O_2$ or $N_2$, is introduced into the chamber 20 via a line 34. Due to the plasma in the chamber 20, the gas is ionized and activated. The vaporized material 35 of the electron beam gun 21 must also pass-through the plasma from the substrate holder 24 so that it too becomes ionized and activated.

The plasma source 22 is electrically insulated from the chamber 20. Apart from the supplied discharge voltage, there is also provided a potential difference between the source 22 and the chamber 20. The source 22 assumes a variable positive potential relative to the chamber 20 while the substrate holder 24 is nearly at the same potential as the chamber 20. The ion energy is determined by the potential difference between the anode tube 26, fed from a direct current source 36 with a positive potential, and the substrate holder 24. The variable potential of source 22 is a function of the discharge voltage, the partial pressures of the gases and the strength of the magnetic field. Through the positive floating potential of the electric field an electric field is generated which reflects the electrons between source 22 and substrate holder 24. If the electrons do not impinge on the anode tube 26 they are reflected on the cathode potential and can again come out of the source. Consequently, oscillating electron paths with effective ionization and excitation of gas atoms and molecules are obtained. Due to the repulsion effect generated by the electric fields in the vicinity of the anode the plasma in front of the substrate holder 24 is dominated by ions. This can be recognized by the potential of the substrate holder 24 which preferably is approximately between 3 and 5 volts relative to the chamber wall 20. The discharge parameters preferably are up to 80 volts discharge voltage, 70 A discharge current, and 5 kW plasma power. The pressures are preferably $1 \times 10^{-4}$ to $8 \times 10^{-4}$ mbars with a ratio of $O_2$:Ar of up to 4:1. The described operation of the plasma source makes it possible to separate the plasma generation process from the vaporization process.

All vaporizable starting materials, for example oxides and fluorides, can be vaporized in the vaporizer 21 since no coupling between plasma source and vaporizer source exists.

For the vapor deposition of a scratch-resistant $SiO_2$ layer, $SiO_2$ granulate is used and is vaporized with electron beam generator 40 in the electron beam vaporizer 21. For this granulate, a relatively low vaporizer power is required. In order to keep the vaporizer power low even in the case of a highly refractive material, for example $Ta_2O_5$, a multicup crucible with cups of minimum size is preferably used (of which only one cup 41 is depicted in FIG. 4). After pumping the chamber 20 down to a pressure below $2 \times 10^{-5}$ mbars, the vapor deposition of the layer system is carried out.

The SiO adhesion layer preferably is deposited at a rate of approximately 0.1 nm/s. The plasma source 22 is added simultaneously with the opening of a vaporizer diaphragm (not shown). The source 22 is herein operated with pure argon at a partial pressure of approximately $2.5 \times 10^{-4}$ mbars. The discharge current is obtaining the desired layer thickness, the plasma source 22 is switched off simultaneously with the closing of the vaporizer diaphragm.

Subsequently, the vapor deposition of the thick $SiO_2$ protective layer takes place. Herein the plasma source 22 is also operated with argon.

The hardness of the $SiO_2$ layer is a function of the plasma discharge power, i.e., current and voltage, the gas pressure, and the coating rate. The hardness gradient of the layer is adjusted with these parameters. Especially low hardness values are achieved with low plasma power (<1 kW) at relatively high pressure (approximately $6 \times 10^{-4}$ mbars), and a high coating rate (approximately 5 to 10 nm/s). The greatest hardness values were achieved in experiments carried out with a plasma power of approximately 5 kW, at a pressure of $1.5 \times 10^{-4}$ mbars and at a rate of 0.1 nm/s. After the desired layer thickness has been achieved, the plasma source 22 is switched off with the closing of the vaporizer diaphragm.

Subsequently, the vapor deposition of the first highly refractive layer $Ta_2O_5$ takes place. In the highly refractive layers the plasma source 22 is also operated with argon. In addition, oxygen is introduced into the chamber 20 through line 34 with a partial pressure of approximately $4 \times 10^{-4}$ mbars. An oxygen inlet directly into the plasma source, analogously to inlet 28, is also possible. During the vapor deposition of the tantalum pentoxide layer the plasma source is operated with a discharge power of approximately 5 kW. The coating rate is approximately 0.2 nm/s. The next layer $SiO_2$ is deposited in principle like the $SiO_2$ protective layer and specifically at a pressure of $2\times10^{-4}$ mbars, a plasma power of approximately 4 kW, and a coating rate of approximately 0.5 nm/s.

The vapor deposition of the succeeding highly refractive layer takes place with the same parameters as the first highly refractive layer. The last $SiO_2$ layer is deposited like the preceding $SiO_2$ layer.

The optimum production parameters of the $\lambda/4$ $SiO_x$ intermediate layer, provided for the attenuation of the oscillations of the spectral curve disposed between the SiO layer and the protective layer, are a function of the hardness and, consequently, the index of refraction of the protective layer. The following parameters are suitable: pressure approximately $2\times10^{-4}$ mbars, plasma power approximately 4 kW, rate approximately 0.1 nm/s.

It is understood that for the generation of atoms, molecules or clusters of the materials, for example SiO or $SiO_2$, which are to be applied onto a synthetic lens and the like, instead of an electron beam vaporizer a thermal vaporizer or a sputtering cathode can be used. It is essential only that the plasma is generated in a device separated from the electron beam gun, etc. The plasma thus generated in the plasma source 22 and the small particles to be applied in a vaporizer source 21, and the uniformity of the resulting coating is especially high. Moreover, the coating parameters can be adjusted largely independently of one another, which is of great significance for the production of layers with selected hardness gradients.

The substrate holder 24, a lower edge of which is denoted by 33, can be rotated by means of a shaft 42. It can be provided on its underside with numerous lenses or the like to be coated. Moreover, the substrate holder 24 can have a vaporizer protection not shown which in the deposition of insulating materials prevents the coating of a portion of the surface of the substrate holder with these insulating materials, and this consequently makes possible the draining of electrical charges via the substrate carrier. Further details of the device according to FIG. 4 can be found in German Patent Application P 40 20 158.9 and are therefore not described in further detail.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. Process for applying thin layers onto a synthetic substrate, said process comprising arranging at least one synthetic substrate in a substrate holder, vaporizing SiO to form layer of SiO on said substrate, said layer having a thickness of one molecule to 50 nm, concurrently with the vaporizing of SiO, irradiating the substrate and the layer of SiO being formed with a first plasma, following formation of said layer of SiO, vaporizing $SiO_2$ to form a layer of $SiO_2$ at least 500 nm thick, concurrently with the vaporizing of $SiO_2$, irradiating the layer of SiO and the layer of $SiO_2$ being formed with a second plasma, and concurrently with the vaporizing of $SiO_2$, varying process parameters including at least one of plasma power, gas pressure, and coating rate so that the layer of $SiO_2$ has a hardness gradient wherein the $SiO_2$ has a hardness which increases from the SiO layer outward.

2. Process as in claim 1 wherein said plasma power is increased over time by increasing the plasma discharge current.

3. Process as in claim 2 wherein said plasma discharge current is increased from 10 amp to 100 amp.

4. Process as in claim 1 wherein said gas pressure is decreased from $8\times10^{-4}$ mbar.

5. Process as in claim 1 wherein said coating rate is decreased from 10 nm/s to 0.1 nm/s.

6. Process as in claim 1 wherein said layer of $SiO_2$ is formed within a time of 5 to 30 minutes.

7. Process as in claim 1 wherein said process parameters are varied so that said layer of $SiO_2$ is formed with said hardness gradient from $500N/mm^2$ to $4500N/mm^2$.

8. Process as in claim 1 wherein during formation of said layer of $SiO_2$, the discharge current increases from 10 A to 100 A, the gas pressure decreases from $8\times10^{-4}$ mbar, and the coating rate decreases from 10 nm/s to 0.1 nm/s, all within 5 to 30 minutes.

\* \* \* \* \*